June 8, 1937.  B. DUTTWEILER  2,083,322
MANUFACTURE OF PROCESSED CHEESE
Filed June 14, 1935  2 Sheets-Sheet 1

INVENTOR
Bruno Duttweiler
BY
Victor D. Borst
ATTORNEY

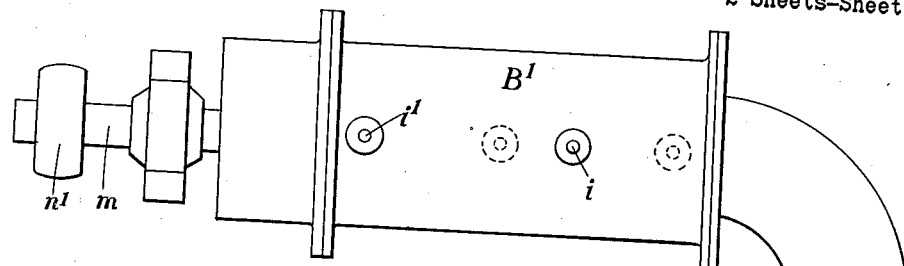
Fig. 3.
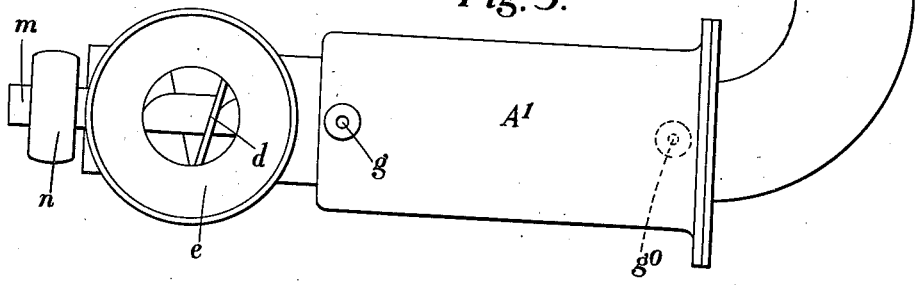
Fig. 4.
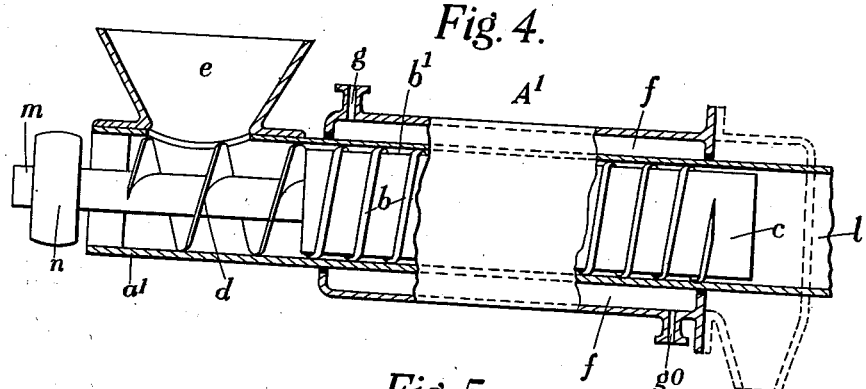
Fig. 5.
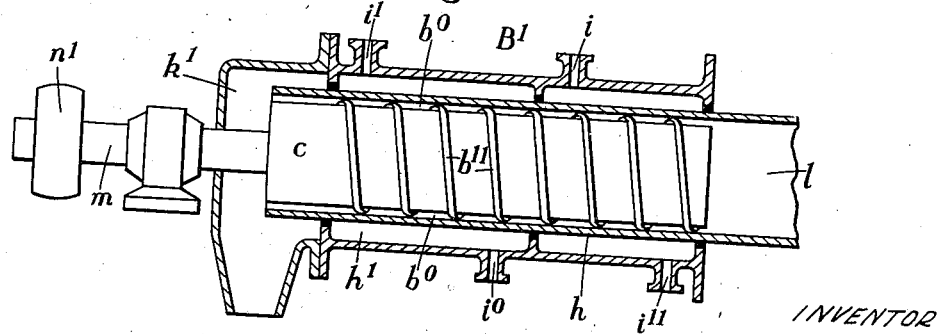

Patented June 8, 1937

2,083,322

UNITED STATES PATENT OFFICE 2,083,322

MANUFACTURE OF PROCESSED CHEESE

Bruno Duttweiler, Vevey, Switzerland, assignor to Raw Products Limited, London, England, a company of England Application June 14, 1935, Serial No. 26,607
In Great Britain June 21, 1934

1 Claim. (Cl. 99—115)

This invention relates to an improved manufacture of what is known in the art as "processed" cheese by means of an improved or modified construction or arrangement of the apparatus described in the specification of my Patent No. 1,993,264, dated 5th March 1935, and consists in feeding and forcing raw cheese, previously cut into small pieces and thoroughly mixed and reduced to a pasty consistency by grinding or other similar or suitable treatment, sucessively into and through a series of jacketed shallow spiral or helicoidal passages constituted by a revoluble cylindrical body or a series of revoluble cylindrical bodies formed or provided with peripheral spiral or helicoidal ribs and enclosed in a jacketed portion or series of jacketed portions of a hollow or tubular member or in jacketed portions of hollow or tubular members of which the inner surface is trued for receiving the similarly trued helicoidal rib in truly fitting contact. Thus the cheese mass, by its passage through the said shallow helicoidal passages, is caused to assume the form of a thin layer whereof the thickness is determined by the quality of the cheese, in which form it is eminently adapted for expeditious heating by contact with the heat transmitting surface of the said jacketed portion or portions of the tubular member or members, the depth of the helicoidal rib and the revolutionary speed of the cylindrical body or bodies being arranged in regulated and predetermined relation to the required temperature of the heating medium, with the result that the thin layers of the pasty cheese mass are uniformly pasteurized and disintegration and fat separation avoided.

The construction or arrangement of the apparatus may be such that the cylindrical body is continuous throughout the series and the helicoidal rib discontinuous, extending only through the jacketed portions of the hollow or tubular member, thus, the cylindrical body may be actuated rotatively from one end and so simultaneously operate the several bodies in a series. The arrangement may, however, be such as to effect a reversal of rotation in respect of neighbouring jacketed portions of the cylindrical body and the latter be suitably mounted and driven to that end.

In the pasteurization of processed cheese, various prior proposals have been put forward including, for example, that in which an Archimedean screw is used to force a mass of cheese through a tube the cheese being pasteurized in the first part of the tube by the injection therein of live steam, the second part of the tube being jacketed and serving to determine the pasteurizing period. It is also known to subject a mouldable cheese to heat treatment by forcing the same in a thin layer over a heated surface formed by a double walled tube having arranged therein a plunger member formed, in some instances, with a screw-like surface and permissibly mounted for rotation.

Now it is to be observed that according to the present invention, pasteurization of the previously ground and pasty mass of raw cheese is effected in a manner which ensures the palatable character of the product; the thin layer of the pasty cheese mass while under the heating or pasteurizing treatment being caused to travel at a relatively rapid rate without risk of the heat transmitting surface with which the said thin layer is continuously in contact during such treatment being coated with a heat insulating deposit of the cheese mass. Thus the heat transmission and the pasteurization are of constant character and therefore no opportunity is afforded for disintegration or fat separation provided the thickness of the thin layer and the speed of travel thereof are in judicious relation to the temperature of the heating medium.

To enable "processed" cheese to be manufactured according to the invention whereby the difficulties heretofore experienced are avoided and the preventive measures usually associated therewith rendered unnecessary, the pasteurization of the cheese mass is obtained by moving a thin layer of the said mass along a shallow helical path as aforesaid in contact with the heat transmitting surface so as to bring about a thorough and expeditious heating with consequent desired pasteurizing effect, the time occupied in the treatment being of much shorter duration than is possible by any of the methods heretofore known or practised. In point of fact and, notably, the duration is so short that no opportunity is afforded for the cultivation of the natural tendency of the fat to separate out of the cheese mass. It is found that these advantages are secured by the employment of a set or series of apparatus of the kind described in the specification of my aforesaid patent dated March 5th 1935, Number 1,993,264. A working series of such apparatus is illustrated in the accompanying drawings, in which:—

Figure 3 is a view in plan showing a series arrangement comprising a pair of jacketed hollow cylindrical or tubular members connected by a curved unjacketed extension of the said tubular members.

Figure 4 is a view in longitudinal section of the first or feeding portion of the series shown in Figure 3.

Figure 5 is a view similar to Figure 4 of the second or delivery portion of the series arrangement shown in Figure 3.

As will be seen the apparatus comprises jacketed portions of hollow cylindrical or tubular members $a$ whereof the inner surfaces are machined or turned to provide true surfaces for the close working contact therewith of truly fitting spiral or helical ribs $b$ formed on a cylindrical body, or a series of cylindrical bodies, $c$ revolubly mounted therein and constituting the shallow helicoidal passage $b'$, the said revoluble body being rotated by or with the aid of driven pulley indicated at $c'$ and a forcing device conveniently in the form of an Archimedean screw $d$ arranged beneath a feeding hopper $e$ which is shown as mounted upon an unjacketed extension $a'$ of the member $a$. Another unjacketed portion or other unjacketed portions $a''$ serve as connectors where required for the jacketed portions and as conducting tubes or passages for the ground and pasty cheese mass or material between separated pasteurizing portions or units of the series.

Figure 1:
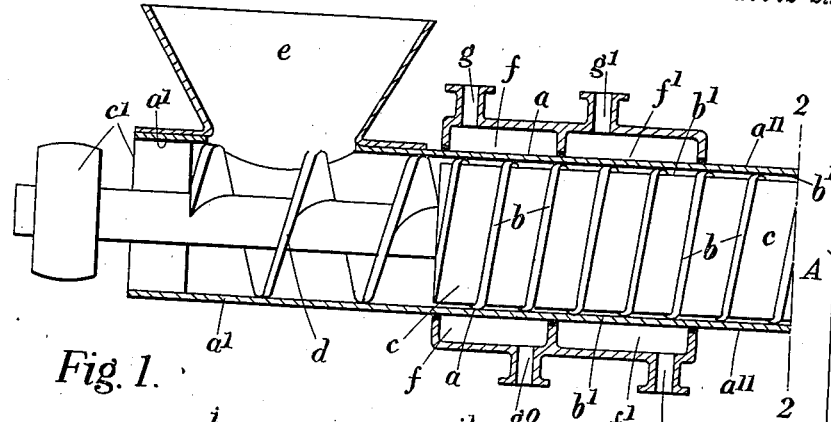
Figure 1 is a longitudinal section of a series arrangement of jacketed hollow cylindrical or tubular members connected by a straight unjacketed portion of the said hollow or tubular member with feeding and forcing means for the ground and pasty cheese mass or material and delivery of product.
Figure 2:
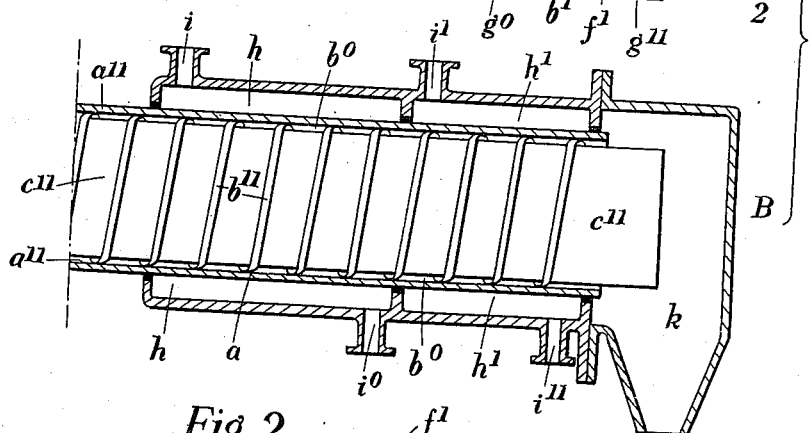
Figure 2 is a view in transverse section on (or about) the line 2—2 in Figure 1.

In Figures 1 and 2, the arrangement is such that the cheese mass from the hopper $e$ is acted upon by the forcing screw $d$ and carried to the shallow helicoidal passage $b'$ in the pasteurizing portion or unit A to which heating medium is admitted to the jacket parts $f$ $f'$ by way of the inlets $g$ $g'$, the temperature thereof being similar in each part or of different degree as desired while the spent medium is discharged by way of the exits $g^o$ $g''$. The cheese having been treated in the part A passes through the unjacketed portion $a''$ of the conducting tube $a$ to the adjoining pasteurizing portion or unit B wherein it is subjected to a further heat treatment while travelling through the shallow helicoidal passage $b^o$ therein similarly formed by the rib $b''$ and cylindrical body $c''$; the heating medium being admitted to the jacketed portions $h$ $h'$ by way of the inlets $i$ $i'$ and discharged therefrom by way of the outlets $i^o$ $i''$. From the portion B the pasteurized cheese is received in the delivery hopper $k$.

Figure 6:
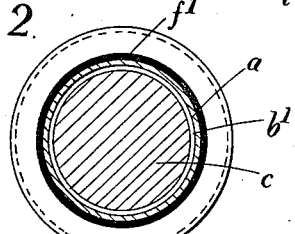
Figures 6 and 7 are, respectively, side and face views of the detachable delivery hopper.
Figure 6:
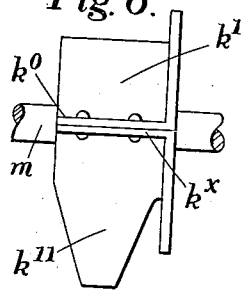
Figure 7:
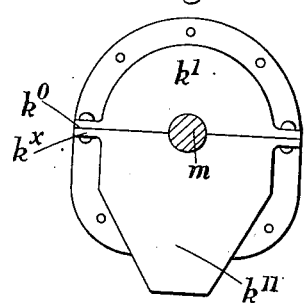

The pasteurizing treatment in the arrangement illustrated in the Figures 3 to 5 is somewhat similar to that just described with reference to Figures 1 and 2. It will be seen that the cheese mass is fed into the portion A' and forced through the shallow helicoidal passage $b'$ and then conveyed by way of the curved conduit $l$ into the portion B' wherein it traverses the shallow helicoidal passage $b^o$ to the delivery hopper $k'$. This hopper $k'$ is formed as a bi-part structure as shown in Figures 6 and 7 in order to facilitate dismantling for repairs, cleaning or the like, the driving shaft $m$ passing therethrough. Thus the upper and lower parts $k'$ and $k''$ respectively are secured by bolts or screws passed through the flanges $k^o K^x$.

The revoluble cylindrical bodies pertaining to the respective portions A' and B' may be driven by belting (not shown) between the pulleys $n$ $n'$ or they may be separately driven as desired. It will be observed that the direction of rotation of the rib-bearing cylindrical bodies and of the travel of the thin cheese layers in the shallow helicoidal passages pertaining to the respective portions or units of the apparatus are oppositely arranged.

Now it must be stated that by judiciously arranging the several items essential to good working, viz: the temperature of the heating medium, the length of the heat transmitting surface, the speed of revolution of the cylindrical bodies which carry the helical ribs and which in conjunction with the heat transmitting surfaces provide the shallow helicoidal passages and the depth of the latter, fat separation is effectually prevented and disintegration avoided.

For example, cheese devoid of any indication of fat separation has been produced by means of a series set of apparatus as hereinbefore described with reference to Figures 3, 4 and 5 of the accompanying drawings, each heat transmitting surface being three metres in length with internal diameters of 70 and 56 mm. respectively in the first and second and the two connected by a conduit tube of 56 mm. diameter; the respective units having the following operating characteristics:—
The depth of the shallow helicoidal passage in the first unit is of 5 mm. and in the second 9 mm. the speed of revolution of the cylindrical body in the first unit is 65 per minute and the speed of the similar body in the second unit 31 revolutions per minute while the temperature of the heating medium in the first unit is 98° C. and in the second unit 97° C. to 98° C.

With a helicoidal passage of the shallow depth given above good results have also been obtained when the revolutionary speed has been increased up to 265 in the first unit and 118 in the second unit and the temperature to 108° C. to 110° C. in both the first and second units.

From the above results of successful trials it will be readily apparent that the process is not restricted in regard to working conditions, particularly the speed of revolution or the temperature of the heating medium, but is capable of highly successful working even when the same is performed under considerably varied conditions.

By the herein described process of manufacture an appreciable reduction is permissible in the quantity of the emulsifying agents usually added to the cheese mass prior to melting the same and in some instances they may be dispensed with altogether.

In effecting the reduction of the previously pieced or granulated and thoroughly mixed raw cheese to the aforesaid pasty consistency, grinding it conveniently and preferably resorted to, a roller mill having four rollers being employed or any other suitable apparatus as will be readily understood by those acquainted with the art to which the invention relates. It may be mentioned, however, that a slight heating of the cheese either before submitting it to the action of the rollers or at the rollers by heating the latter is found of great advantage.

For the purpose of obtaining the prescribed composition of "processed" cheese, the addition of water in small quantity may be necessary during the treatment, particularly if the quantity of emulsifying agent usually considered necessary has been reduced, and a larger quantity of water if no emulsifying agent is employed, the water being added to the raw cheese preferably before reducing the same to the pasty consistency and such water may contain flavouring matter such as, for instance, citric acid or/and salt, with, if desired, the addition of emulsifying agents.

What I claim and desire to secure by Letters Patent of the United States is:—

In the method of manufacturing processed cheese, the steps comprising reducing raw cheese to a pasty consistency, drawing the pasty mass of cheese into a thin, continuous, ribbon-like layer of uniform thickness, and successively moving the cheese so drawn along an externally heated surface, an intermediate, non-heated section and again moving the cheese drawn into a thin uniform layer along another heated surface.

BRUNO DUTTWEILER.